United States Patent [19]
Haines

[11] Patent Number: 5,640,255
[45] Date of Patent: Jun. 17, 1997

[54] HOLOGRAPHIC AUTHENTICATION PATCH

[76] Inventor: Kenneth A. Haines, 214 Pestana, Santa Cruz, Calif. 95065

[21] Appl. No.: 265,676

[22] Filed: Jun. 23, 1994

[51] Int. Cl.$^6$ ............................................. G03H 1/00
[52] U.S. Cl. ........................ 359/2; 359/10; 359/11; 359/32
[58] Field of Search ........................ 359/2, 3, 8, 10, 359/12, 27, 28, 32, 33, 16; 283/72, 74, 86; 235/457; 356/347, 348

[56] References Cited

U.S. PATENT DOCUMENTS

| | | | |
|---|---|---|---|
| 3,639,029 | 2/1972 | Haines | 359/30 |
| 4,432,597 | 2/1984 | Bjorklund et al. | 359/16 |
| 4,486,070 | 12/1984 | Benton | 359/627 |
| 4,725,111 | 2/1988 | Weitzen et al. | 359/12 |
| 5,155,604 | 10/1992 | Miekka et al. | 359/2 |
| 5,260,149 | 11/1993 | Monroe et al. | 430/1 |

*Primary Examiner*—Paul M. Dzierzynski
*Assistant Examiner*—Darren E. Schuberg
*Attorney, Agent, or Firm*—Dickinson, Wright, Moon, Van Dusen & Freeman

[57] ABSTRACT

A method is disclosed to holographically mark an object in a way that the mark cannot be removed, reproduced, or transferred covertly. The mark can be read from a distance so that the part can be verified as the one and only original. The mark is applied to an undulating or rough surface of the object. The method requires that a reference wave be reflected from the surface and holographically recorded. This wave is then regenerated so that it travels in the opposite direction. This regenerated wave is itself reflected from the surface to form a collimated reference wave which, together with an object wave, is used to form the holographic mark. The recorded image cannot be observed without the presence of the surface itself.

23 Claims, 1 Drawing Sheet

HOLOGRAPHIC AUTHENTICATION PATCH

BACKGROUND OF THE INVENTION

Most holograms used for authentication purposes are, like the Master Card hologram, of the embossed variety. A three-dimensional image is created when light is diffracted from a finely-grooved, reflective surface. Such a structure is typical of credit card holograms. Embossed holograms discourage counterfeiting simply because they require advanced technology for production and cannot be made inexpensively in small quantities. The effectiveness of methods which use embossed holography is swiftly declining as counterfeiters become more sophisticated.

Volume holograms are more difficult to counterfeit than are embossed holograms. They can be created either as transmission or reflection holograms. In transmission holography, the reference wave passes through the recording material and diffracts into the image beam light which travels more or less in the same direction as the reference wave. In reflection holography, the reference wave reflects from structure within the volume of the hologram and forms the object wave. A variety of diffracting mechanisms can be employed in forming a volume hologram, depending on the material and its processing. One of these materials, discussed in this disclosure, is a photopolymer material. Such a material, produced by DuPont, can be processed in situ since it requires no wet processing.

Both volume and surface relief holograms are recorded as flat, planar structures. This is usually necessary in order to guarantee that a recognizable image is reconstructed from them when they are illuminated with a collimated or point source of light. Their application to complex surfaces has been avoided. Holograms of simple shape, such as flat or perhaps slightly curved, provide a potential counterfeiter with an opportunity to create a simulation of them. Many flat holograms, for example, can be copied using simple contact copying methods.

SUMMARY OF THE INVENTION

It is an object of this invention to develop an efficient, tamperproof holographic marking technique that is unique to the object being marked, and that will identify the marked unit as the one and only original.

This is accomplished in the following way. A rough or undulating surface of the object is selected. A pre-made hologram applied to such a surface will not give rise to a recognizable image unless the hologram is prohibited from following intimately the grooves and contours of the surface. This is so because either the reconstructing illumination beam, or the image beam arising from the hologram must reflect off the rough surface, thus destroying the imagery. In general, after a hologram is produced, the original object wave can be produced only if a replica of the original reference wave, no matter how complex, is used to illuminate the hologram. If a replica of the original reference wave is not available, then a replica of the original object wavefront cannot be reproduced. How much deviation from the original reference wave is allowable is a matter of design.

In a preferred embodiment, a more or less collimated reference beam is reflected from the complex surface of the object. The surface scatters this wave so that it is no longer collimated. The wave is captured in a preliminary hologram and its pseudoscopic (or reversed direction) image is directed back onto the surface. (This pseudoscopic image generation is a common technique in holography and simply requires that the reference beam for the preliminary hologram be reversed in direction.) The pseudoscopic image wave is itself reflected from the surface. After it is so reflected, it becomes a replica of the original collimated reference (although now travelling in the reverse direction) provided that the surface remained unaltered in any way. It is this reflected replica together with an incident object beam, which are used to form the hologram, (in the reflection holography mode). Thus not only is the shape of the surface rendered non-detrimental to the image, it is also essential for image reconstruction.

DETAILED DESCRIPTION OF THE PREFERRED EMBODIMENTS

In a preferred embodiment of the method discussed herein, a photopolymer material (such as the OMNIDEX materials developed by DuPont) is utilized. Surface relief materials and photographic materials are also applicable, but certain types of photopolymers may be preferred because they require no wet processing and are therefore ideal for in situ applications.

Unlike photographic material, photopolymer material changes its refractive index through a process of polymerization when exposed to light. This can lead to more efficient diffraction of light than is possible with ordinary photographic materials and is ideally suited to holography.

Figure 1:
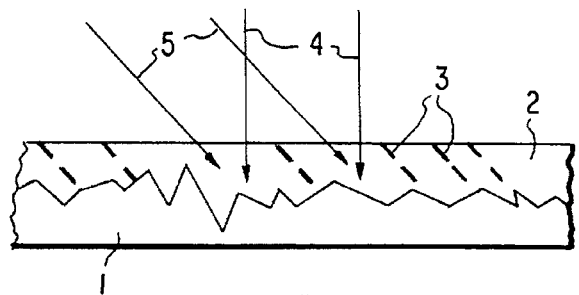
FIG. 1. Hologram applied to a generalized rough surface.

The photopolymer holograms discussed herein are volume holograms rather than the surface-relief type primarily used in security. With volume holograms, the incident light is reflected or diffracted from alternate layers of higher and lower index material which are located throughout the volume of the hologram. FIG. 1 illustrates a rough surface 1 such as a metal object which has been prepared by coating with a thin film of photopolymer 2. The surface is rough compared to the wavelength of light and may be curved.

In FIG. 1, the parallel fringes 3 shown would be constructed only if the object beam 4 and referenced beam 5 were plane waves.

Figure 2:
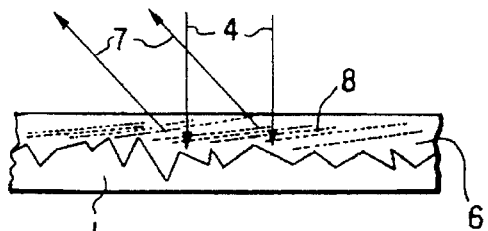
FIG. 2. Producing a reflection volume hologram.

A reflection type of volume hologram can also be constructed in a photopolymer material 6 as illustrated in FIG. 2, by reversing the direction of the construction reference beam. The method of producing such a beam is explained in the following discussion.

Notice that the fringes 8 are much closer together and more parallel to the surface for the reflection hologram, a feature which is quite significant for the selection of the photopolymer material related to this disclosure (DuPont OMNIDEX). Variations in the refractive index of the photopolymer occur because the monomer diffuses from one area to another during exposure to the interfering light beams. For transmission materials, the diffusion takes place over relatively large distances (from one fringe to the next). The material, which must be conducive to this diffusion, also shrinks appreciably after exposure but this shrinking does not necessarily degrade the image since the fringe spacing is not proportionately greatly affected. But for the reflection hologram, any small material shrinkage would cause the closely spaced fringes to become even closer spaced with the net result being that the image could no longer be reconstructed with visible light.

The reflection material therefore must be constructed so as to prohibit shrinkage. Fortuitously, even though this formula impedes monomer diffusion over large distances, such an impediment is unimportant since the fringes are so close together. This does however result in a material that is often unsuitable for transmission holography, a fact which we put to use in the disclosure. The significance of these differences is that reflection holograms cannot be constructed with photopolymer materials designed for transmission holograms, and vice versa.

Both reflection and transmission holograms produced in a photopolymer-coated rough (or undulating) surface as shown in FIGS. 1 and 2 will support fringe structure, but neither will allow image reconstruction if they are formed in situ with the material being backed by the rough or undulating reflective surface unless a special modification is added to the process. In the following paragraphs a unique modification to the recording process is described whereby the image can be reconstructed as long as the photopolymer remains on the identical surface where originally installed. The process allows either transmission or reflection holography to be used.

First, consider the transmission hologram of FIG. 1. An object beam will be reconstructed in the hologram material if it is illuminated with a reference beam which mimics the construction reference beam. But before it can exit the hologram, it is reflected from the diffuse metal surface, thus losing its imaging capabilities. One way for the object beam to leave the material unaltered by the rough surface, is to create a reference beam which travels in the opposite direction. Such a scheme is shown in FIG. 3.

The question then is how to create a plane wavefront emerging from a rough, diffuse surface. This can be achieved only through the use of holography in the following way.

Figure 3A:
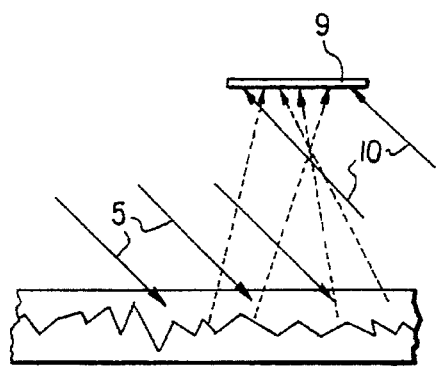
FIG. 3. Reconstructing a viewable image from the volume hologram recorded on a diffuse surface.
Figure 3B:
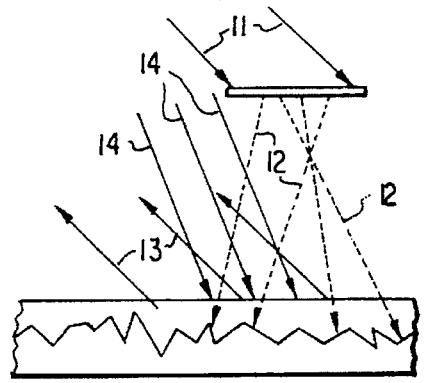

First, a reference beam 5 is reflected from the metallic surface and captured in a preliminary hologram 9, as shown in FIG. 3(a), by combination with preliminary hologram reference beam 10. Then the direction of the preliminary hologram reference beam is reversed (11 in FIG. 3(b)), recreating a reversed direction replica (a conjugate) of the original diffused beam 12, which is reflected from the surface as a plane wave reference 13.

At the same time, the object beam 14 passes through the photopolymer material and forms a hologram by interaction with beam 12, which is created by the preliminary hologram when illuminated by beam 11. Now, if this hologram is illuminated with a reference beam like 5 of FIG. 3(a), its reflection from the metallic surface gives rise to an object beam which is a replica of beam 14 but reversed in direction. By this process, the pattern or shape of the metallic surface does not destroy the image.

As a note of interest, during the hologram construction, the object beam 14 is reflected and scattered by the rough surface, and this scattered beam forms a second hologram in the photopolymer as it interferes with beam 13. When the hologram is re-illuminated with the reference beam of FIG. 3(a), it recreates this scattered object beam (albeit in a reversed direction). This scattered beam impinges on the metallic surface and is reflected as another identical replica of the original beam 14.

So the above process creates viewable transmission holograms in a photopolymer coated rough surface that would otherwise not be viewable.

This same process can be applied in the creation of a reflection hologram in reflection polymer material. However, for this case, it is the reflected plane wave 13 rather than beam 12 which interferes with object beam 14 to form the hologram. After hologram construction, a reversed direction replica of the reference beam 13 (i.e., like the incident reference wave 5 of FIG. 3(a)) gives rise to a reconstructed object wave (i.e., 14 but reversed in direction).

As was the case with the transmission material, the object beam 14 which is scattered from the rough surface forms a second holographic structure. But in this case, it is created when this reflected beam combines with beam 12, rather than beam 13. Upon re-illumination, a reversed replica of beam 12 gives rise to a reversed replica of this scattered object beam, which is directed downward to the rough surface from which it is reflected as a copy of the original object beam. Again, the two resulting object beams are identical.

The unique feature of holograms formed by the method shown in FIG. 3 to be exploited here is that images from neither can be reconstructed without the original underlying metal surface which could not be precisely duplicated. This implies that the holograms cannot be read if they are moved from one surface to another.

Any attempt to avoid correct authentication by prerecording the hologram first on a smooth, flat surface (which is subsequently adhered to the rough metal surface), will fail (FIG. 3). The dependence on the signature of the surface is avoided by this process, but extra noise-like beams are created from light reflected by the metal surface which would be easily identifiable by the trained viewer.

Figure 4:
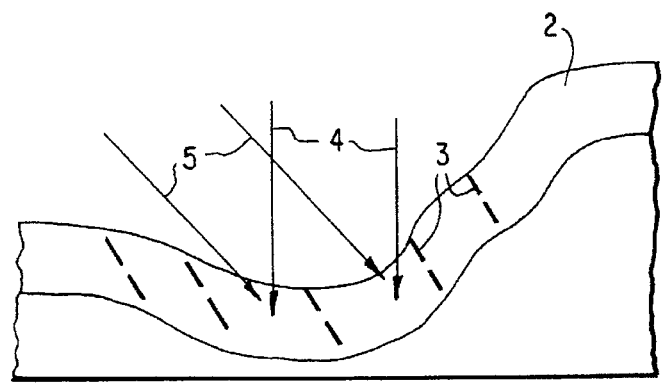
FIG. 4. Hologram applied to an undulating surface.

With another preferred embodiment, the photopolymer is applied as a thin layer (5 to 20 microns) across a grossly varying surface that is not flat, as is shown in FIG. 4. It is then physically impossible to reconstruct a pre-recorded hologram. An observation of a reconstructed image authenticates that the hologram was made for that specific item.

The resulting hologram will contain the signature of the surface and cannot be reconstructed in its absence, the imagery contained in the hologram can be covert or overt and may be 3-D if desired. The overt images are easily observed requiring nothing more than a simple light source, such as a flashlight.

What is claimed is:

1. A hologram and a complex, at least partially reflective surface, wherein said hologram is adhered to said complex surface and produces a recognizable three dimensional image when illuminated with a beam of light reflected from said complex surface, thus providing au authentication of said complex surface.

2. The combination of claim 1 wherein said hologram is a photopolymer hologram.

3. The combination of claim 1 wherein the variations in the profile of said complex surface are larger than the thickness of the hologram.

4. The combination of claim 1 wherein said complex surface is a diffusely reflecting surface.

5. The combination according to claim 1 wherein said hologram is a volume hologram.

6. A combination according to claim 1 wherein said hologram is in intimate contact with said complex surface.

7. A method of recording an authentication hologram which is in intimate contact with a rough or undulating surface, by the process of illuminating the surface with a first beam of coherent light, and recording the reflected beam from the surface in a preliminary hologram, illuminating the preliminary hologram such that a reflected beam replica is created, but which leaves the preliminary hologram and travels in the opposite direction from that of the original reflected beam, and which furthermore strikes the surface and is itself reflected from it, directing an object beam onto the surface, said surface being covered, in part, with a holographic recording material which follows the curvatures of the surface, thereby forming an authentication hologram from the interference patterns of the object beam and the reference beam replicas.

8. A method according to claim 1 in which the authentication hologram is a transmission hologram and is formed by the incident object beam and the reference beam replica.

9. A method according to claim 7 in which the authentication hologram is a transmission hologram and is formed by the incident object beam and the reference beam replica, both of which are reflected from the surface.

10. A method according to claim 7 in which the authentication hologram is a reflection hologram and is formed by the incident object beam, and the reference beam replica which is reflected from the surface.

11. A method according to claim 7 in which the authentication hologram is a reflection hologram and is formed by the incident object beam which is reflected from the surface and the reference beam replica.

12. A method according to claim 7 in which the authentication hologram is recorded in a photopolymer material.

13. A method according to claim 7 is which the authentication hologram is much thinner than the magnitude of the undulations of the surface.

14. A method according to claim 7 in which the holographic recording material for the authentication hologram is applied to the surface prior to the step of illuminating the surface with a first beam of coherent light.

15. A hologram made by the process of claim 7.

16. A method according to claim 7 in which the surface is a diffuse surface.

17. A hologram for authenticating an optically complex, at least partially reflective object, wherein said hologram comprises a holographic recording medium forming an overlay for said object, said holographic recording medium having recorded thereon a holographic pattern for producing a recognizable three-dimensional image when said hologram is overlying said optically complex object and is illuminated with a beam of light reflected from said complex object, thus authenticating said complex object.

18. A hologram for authenticating an optically complex, at least partially reflective object, wherein said hologram comprises a holographic recording medium for overlying said optically complex object, said holographic recording medium having recorded thereon a holographic pattern for producing a recognizable image when said hologram is overlying said object and light diffracted from said hologram is reflected from said complex object to produce said recognizable image, thus authenticating said complex object.

19. A hologram according to claim 18 wherein said hologram has recorded thereon a holographic pattern for producing said recognizable pattern when said hologram is in contact with said object.

20. A hologram for authenticating an object, said hologram comprising a holographic medium having recorded thereon an interference pattern representing an optically complex reference beam and an information beam having a recognizable, three dimensional image, wherein said hologram, when placed in contact with said object, reconstructs said information beam to create said recognizable image when illuminated with said optically complex reference beam that is generated by said object, thereby authenticating said object.

21. A method of authenticating an article containing an optically complex surface comprising the steps of:

providing a holographic recording material for overlying said optically complex surface, constructing a replica of at least a portion of a beam of light reflected from said surface, said replica traveling in a direction opposite that of said beam of light, directing said replica onto said holographic recording material, directing an object be on of a recognizable three dimensional image onto said recording material to form an authentication hologram from the interference patterns of the object beam and said replica, overlying said authentication hologram on said article, and illuminating said authentication hologram with a simple reference beam to observe an image of the object beam.

22. A method according to claim 21 wherein said step of overlying said authentication hologram comprises the step of contacting said article with said authentication hologram.

23. A hologram for use in conjunction with a complex, at least partially reflective surface, said hologram comprising a holographic recording medium having recorded thereon a holographic pattern that produces a recognizable three dimensional image when said hologram overlays said surface and is illuminated with a beam of light reflected from said complex surface, thus providing an authentication of said complex surface.

* * * * *